US006220739B1

(12) United States Patent
Harada et al.

(10) Patent No.: US 6,220,739 B1
(45) Date of Patent: Apr. 24, 2001

(54) VEHICULAR LIGHT FIXTURE WITH SYNTHETIC RESIN LAMP BODY HAVING ALTERNATE CONVEX AND CONCAVE PORTIONS

(75) Inventors: Tatsuhiko Harada; Yasuhiro Nakamura, both of Shimizu (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/257,263

(22) Filed: Feb. 25, 1999

(30) Foreign Application Priority Data

Mar. 27, 1998 (JP) ............................................... 10-080625

(51) Int. Cl.[7] .............................. B60Q 1/00; F21V 29/00

(52) U.S. Cl. .......................... 362/547; 362/546; 362/294; 362/373

(58) Field of Search .................................... 362/547, 546, 362/294, 362, 373

(56) References Cited

U.S. PATENT DOCUMENTS 4,862,337 8/1989 Ohshio et al. ...................... 362/547
5,497,308 3/1996 Ohtsuka et al. ..................... 362/547
5,562,337 10/1996 Takinami et al. .................... 262/547
5,743,630 * 4/1998 Yanagihara et al. ................ 362/294

FOREIGN PATENT DOCUMENTS 31 06 319 11/1987 (DE) ................................ F21V/7/10
42 34 919 11/1994 (DE) ................................ F16M/1/00

* cited by examiner

*Primary Examiner*—Alan Cariaso
*Assistant Examiner*—Ronald E. Delgizzi
(74) *Attorney, Agent, or Firm*—Sughrue, Mion, Zinn, Macpeak & Seas, PLLC

(57) ABSTRACT

A vehicular light fixture having a lamp body opened to a front surface thereof, a lens covering the front opening of the lamp body, and a light source bulb disposed in a light chamber defined by the lamp body and the lens, the lamp body being made of a synthetic resin and formed at a part thereof with bent zones, other portions of the lamp body than the bent zones having a substantially uniform wall thickness, and the bent zones having a smaller wall thickness than the other portions of the lamp body than the bent zones.

18 Claims, 3 Drawing Sheets

VEHICULAR LIGHT FIXTURE WITH SYNTHETIC RESIN LAMP BODY HAVING ALTERNATE CONVEX AND CONCAVE PORTIONS

BACKGROUND OF THE INVENTION

The present invention relates to a novel vehicular light fixture, and, more particularly, to a technology for preventing dew condensation on inner surfaces of a lens.

In such vehicular headlight 1', the lamp body 2' is made of a synthetic resin to be substantially uniform in thickness thereover.

Such conventional vehicular headlight has presented a problem that when air temperature in the light chamber 4' drops, dew condensation is liable to occur on inner surfaces of the lens 3'.

When dew condensation has occurred on the inner surfaces of the lens 3', water droplets adhering to the inner surfaces of the lens 3' will cause light from a light source to be refracted to create glare, and the inner surfaces of the lens 3' will become dirty or bad in appearance, disadvantageously.

In this respect, the present invention aims at making dew condensation hard to occur on inner surfaces of a lens.

SUMMARY OF THE INVENTION

To solve the above problem, a vehicular light fixture according to the present invention is constructed such that a lamp body is made of a synthetic resin and formed at a part thereof with bent zones, other portions of the lamp body other than the bent zones have a substantially uniform wall thickness, and the bent zones have a smaller wall thickness than that of the other portions of the lamp body other than the bent zones.

Accordingly, in the case where, for example, moisture in a light chamber is as great as causing dew condensation and temperature in the light chamber drops in the event of a shift from a lighting mode to a putting-out mode, thin walled bent zones first drops in temperature to cause dew condensation on the bent zones having thus dropped in temperature, so that dew condensation is hard to occur on inner surfaces of a lens.

Also, the bent zones are bent while being thin-walled, so that they will not be reduced in strength.

An embodiment of a vehicular light fixture according to the invention will be described below with reference to the accompanying drawings. In addition, the embodiment shown is an application of the invention to a vehicular headlight.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

Figure 1:
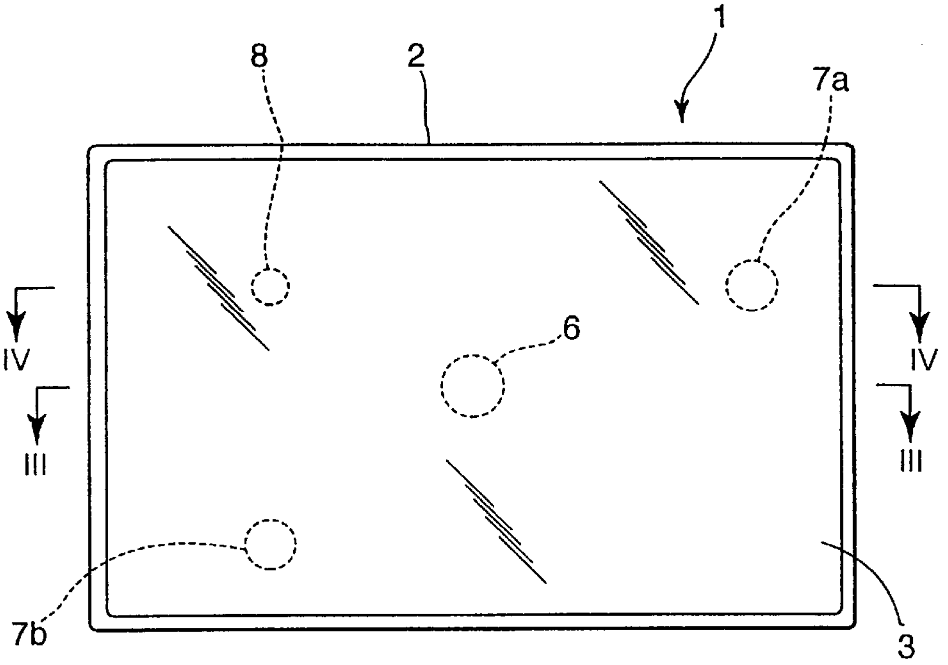
FIG. 1 is a front view showing an embodiment, in which a vehicular light fixture according to the present invention is applied to a vehicular headlight.
Figure 2:
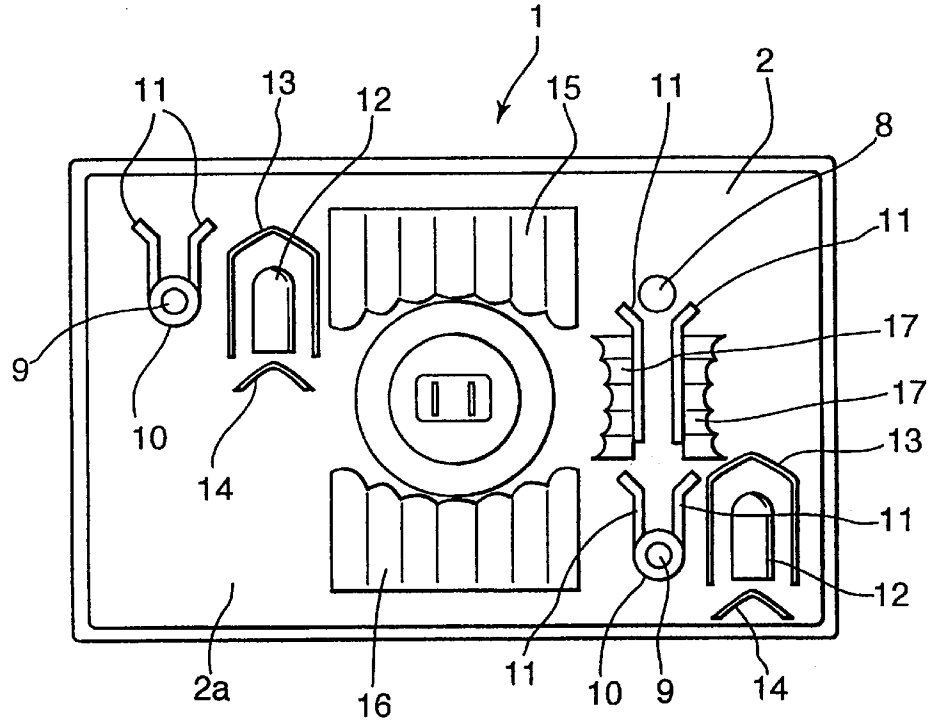
FIG. 2 is a rear view showing the embodiment shown in FIG. 1.
Figure 3:
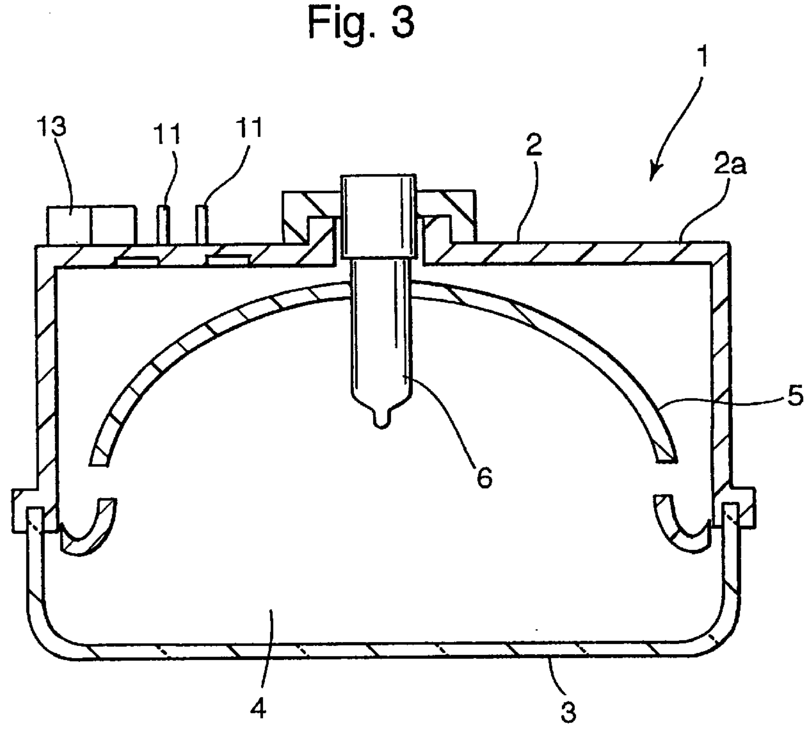
FIG. 3 is a cross sectional view taken along the line III—III in FIG. 1.
Figure 4:
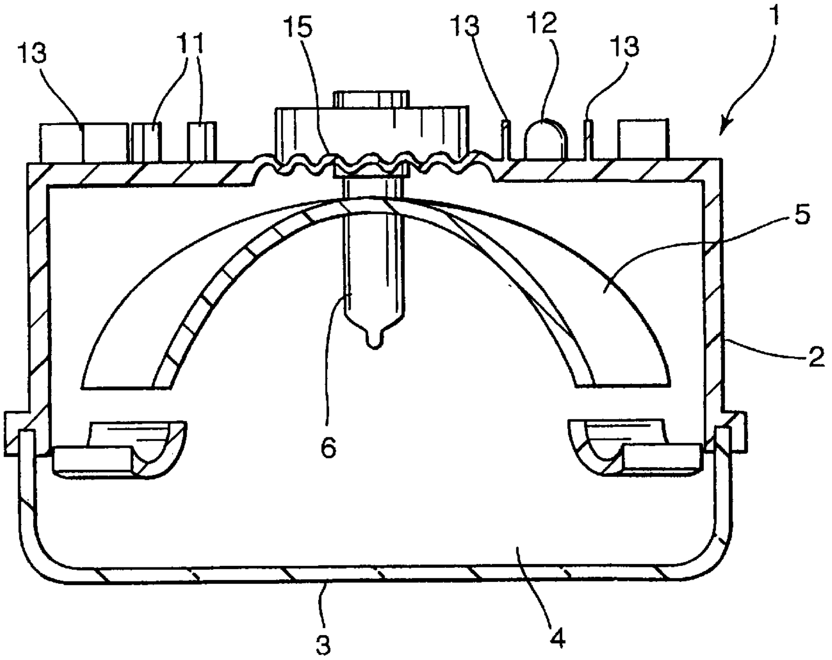
FIG. 4 is a cross sectional view taken along the line IV—IV in FIG. 1.
Figure 5:
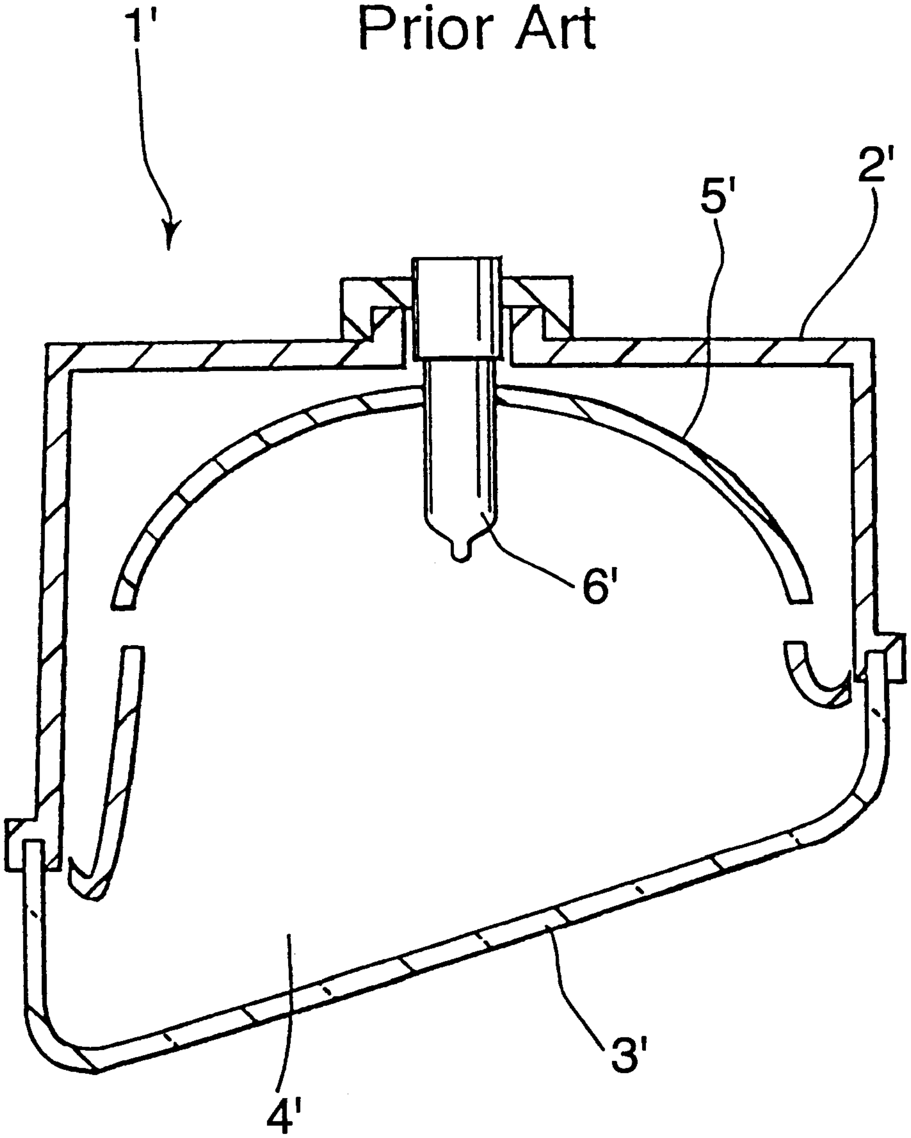
Fig. 5 Prior Art
FIG. 5 is a horizontal cross sectional view showing an example of a conventional vehicular light fixture.

As shown in FIGS. 1–4, a vehicular headlight 1 comprise a lamp body 2 made of a synthetic resin and opened at a front surface thereof, a lens 3 mounted to the lamp body 2 to cover the front opening of the lamp body, a reflector 5 arranged in a light chamber 4 defined by the lamp body 2 and the lens 3 to be capable of being inclined, and a light source bulb 6 supported on the reflector 5.

The reflector 5 is supported at two spacing adjusting points 7*a*, 7*b* and a single turning fulcrum 8 to be inclinable relative to the lamp body 2. Aiming screws 9, 9 connect the reflector 5 and the lamp body 2 at the spacing adjusting points 7*a*, 7*b*, respectively, and are rotatingly operated to change spacings between the reflector 5 and the lamp body 2 at the screws. More specifically, rotating operation of the aiming screw 9 at the upper spacing adjusting point 7*a* causes the reflector 5 to turn on a rotating axis, which is defined by a line connecting the lower spacing adjusting point 7*b* and the turning fulcrum 8, or turn right and left, and rotating operation of the aiming screw 9 at the lower spacing adjusting point 7*b* causes the reflector 5 to turn on a rotating axis, which is defined by a line connecting the upper spacing adjusting point 7*a* and the turning fulcrum 8, or turn up and down.

Rear ends of the aiming screws 9, 9 project beyond a back surface of the lamp body 2 to provide gears 10, 10 fixedly thereon. Formed above these gears 10, 10 are two guide walls 11, 11 which are spaced right and left and extend vertically in parallel to each other. A jig, for example, a screwdriver for plus screws, is guided from above by the guide walls 11, 11 to have its tip end engaged with the gears 10, 10.

Further, vent holes (not shown) for providing for communication inside and outside the light chamber 4 are formed on a rear surface wall 2*a* of the lamp body 2, waterproof pipes 12, 12 having an inverted L-shape in side configuration are mounted to cylindrical portions (not shown) provided to project rearward from rear side opening edges of the vent holes, and roof walls 13, 13 covering upper and lateral sides of the waterproof pipes 12, 12 and water-barrier walls 14, 14 opposed to openings at the lower ends of the waterproof pipes 12, 12 are provided to be projectingly integral with a rear surface of the rear surface wall 2*a* of the lamp body 2.

Bent zones 15, 16 and 17, 17 are formed on the rear surface wall 2*a* of the lamp body 2.

Either one of the bent zones 15, 16 and 17, 17 is formed to be thinner than the remaining portions of the lamp body 2, and is zigzag-shaped as viewed in cross section, that is, formed with alternate convex and concave portions as viewed from either front or rear.

The convex and concave portions on the upper bent zone 15 are formed to be successive right and left at the center on an upper portion of the rear surface wall 2*a*, and the convex and concave portions on the lower bent zone 16 are formed to be successive right and left at the center on a lower portion of the rear surface wall 2*a*. In addition, the convex and concave portions on the side bent zones 17, 17 are formed to contact with sides of the guide walls 11, 11 to be successive in a vertical direction.

Other portions of the lamp body 2 other than the bent zones 15, 16 and 17, 17 have a greater wall thickness than these bent zones do, and are substantially uniform in wall thickness. In addition, it is preferable that the bent zones 15, 16 and 17, 17 have a wall thickness in the range of 1.0 mm to 1.5 mm and the other portions of the lamp body 2 other than the bent zones 15, 16 and 17, 17 have a wall thickness of 2.0 mm or more. Such selection of the values makes a flow of a resin favorable during molding without impairing formability and makes it easy to generate dew condensation at the bent zones.

With the vehicular headlight 1, if temperatures in the light chamber 4 rapidly drops, for example, in the event of a shift from a lighting mode to a putting-out mode, the bent zones 15, 16 and 17, 17 thinned as compared with the remaining portions first drop in temperature to thereby cause dew condensation thereon even when a moisture content is great in the light chamber 4, and dew condensation is not caused on the lens 3 or quite slight if any. Accordingly, problems such as generation of glare light, dirt on the lens 3, degraded appearance or the like accompanying dew condensation on the lens are dissolved.

In addition, such bent zones make the thinned portions large in surface area to enlarge a contact area contacting with outside air, thereby enabling making temperature liable to drop.

Further, formation of the bent zones on the rear surface wall 2*a* of the lamp body 2 as in the above embodiment eliminates the need of metallic slide dies for formation of the bent zones, and makes formability favorable, and even if dew condensation could spread around the bent zones 15, 16 and 17, 17, there is no fear that dew condensation reaches the lens 3.

Further, being alternately successive on the bent zones, the convex and concave portions are capable of preventing a decrease in strength while being thin-walled, and are easy to form in accordance with a basic configuration of the light fixture.

In addition, in the case where the convex and concave portions are shaped to be alternately successive on the bent zones, they are made to extend in a direction perpendicular to a direction, in which adjacent rib-shaped portions (the guide walls 11, 11), as in the bent zones 17, 17, extend, so that even if they are thin-walled, the adjacent rib-shaped portions prevents a decrease in strength for the lamp body 2.

Since temperatures are low by nature in a position below a light source (the light source bulb 6), formation of the bent zones in positions lower than that of the light source can make the bent zones suitable as portions which positively conduct dew condensation.

While the present invention is applied to a vehicular headlight in the above embodiment, the present invention is not intended to be limitedly applied to a vehicular headlight but the present invention is widely applicable to other vehicular lights, for example, vehicular marker lamps.

Also, a region where the bent zones are formed is not limited to the rear surface wall of the lamp body but may be provided on upper and lower wall surfaces or side wall surfaces of the lamp body.

As apparent from the above description, the vehicular light fixture according to the present invention has a feature in that it comprises a lamp body opened to a front surface thereof, a lens covering the front opening of the lamp body, and a light source disposed in a light chamber defined by the lamp body and the lens, the lamp body being made of a synthetic resin and formed at a part thereof with bent zones, other portions of the lamp body other than the bent zones having a substantially uniform wall thickness, and the bent zones having a smaller wall thickness than the other portions of the lamp body other than the bent zones.

Accordingly, in the case where, for example, moisture in the light chamber is as great as causing dew condensation and temperature in the light chamber drops in the event of a shift from the lighting mode to the putting-out mode, the thin walled bent zones first drop in temperature to cause dew condensation on the bent zones having thus dropped in temperature, so that dew condensation is hard to occur on the lens inner surfaces.

Further, the bent zones are bent while being thin walled, so that they are not decreased in strength.

Also, the configuration of the bent zones enlarges the thin-walled portions in surface area to increase an area, with which outside air contacts, thus enabling making the bent zones liable to drop in temperature.

Further, in one aspect of the invention, the bent zones are formed on the rear surface wall of the lamp body to be favorable in formability without the need of any slide metallic die for formation of the bent zones. Besides, even if dew condensation spread to as far as around the bent zones, there would not be the possibility that such dew condensation spread to the lens.

Further, in further aspect of the invention, the bent zones are configured such that the convex and concave portions are formed alternately, so that it is easy to form the bent zones in conformity with the basic configuration of the light fixture.

Besides, in still further aspect of the invention, the bent zones on the lamp body have a wall thickness in the range of 1.0 mm to 1.5 mm and the other portions of the lamp body than the bent zones have a wall thickness of 2.0 mm or more. Therefore, it is possible to make dew condensation liable to occur on the bent zones while providing good flowing of a material resin during the molding without impairing formability.

In further aspect of the invention, the bent zones are formed at least in positions lower than a position where the light source is arranged, so that since temperatures are low by nature in a position below the light source, it is possible to make the bent zones suitable as portions which positively conduct dew condensation.

Structures and configurations of the respective portions and parts in the embodiment described above are only exemplary in practicing the invention, and it should not be interpreted that the technical scope of the invention be limited to these embodiments.

What is claimed is:

1. A vehicular light fixture comprising:

a lamp body opened to a front surface thereof, said lamp body being made of a synthetic resin;

a lens covering a front opening of said lamp body; and a light source disposed in a light chamber defined by said lamp body and said lens; and bent zones, comprising a plurality of successive bends, formed as a part of said lamp body, wherein other portions of said lamp body other than said bent zones have a substantially uniform wall thickness, and said bent zones have a smaller wall thickness than said other portions of said lamp body.

2. The vehicular light fixture according to claim 1, wherein said bent zones are formed on a rear surface wall of said lamp body.

3. The vehicular light fixture according to claim 1, wherein said bent zones are formed on an upper wall surface of said lamp body.

4. The vehicular light fixture according to claim 1, wherein said bent zones are formed on a lower wall surface of said lamp body.

5. The vehicular light fixture according to claim 1, wherein said bent zones are formed on upper and lower wall surfaces of said lamp body.

6. The vehicular light fixture according to claim 1, wherein said bent zones are formed on a side wall surface of said lamp body.

7. The vehicular light fixture according to claim 1, wherein said bent zones are formed on both side wall surfaces of said lamp body.

8. The vehicular light fixture according to claim 1, wherein said bent zones are formed with alternate convex and concave portions.

9. The vehicular light fixture according to claim 1, wherein said bent zones of said lamp body have a wall thickness in the range of 1.0 mm to 1.5 mm and the other portions of said lamp body than said bent zones have a wall thickness of 2.0 mm or more.

10. The vehicular light fixture according to claim 1, wherein said bent zones are formed with alternate convex and concave portions and wherein said bent zones of said lamp body have a wall thickness in the range of 1.0 mm to 1.5 mm and the other portions of said lamp body than said bent zones have a wall thickness of 2.0 mm or more.

11. The vehicular light fixture according to claim 1, wherein the bent zones are formed in positions lower than a position where said light source is arranged.

12. The vehicular light fixture according to claim 1, wherein said bent zones are formed with alternate convex and concave portions, and are formed in positions lower than a position where said light source is arranged.

13. The vehicular light fixture according to claim 1, wherein said bent zones are formed with alternate convex and concave portions, and are formed in positions lower than a position where said light source is arranged, and wherein said bent zones of said lamp body have a wall thickness in the range of 1.0 mm to 1.5 mm and the other portions of said lamp body than said bent zones have a wall thickness of 2.0 mm or more.

14. The vehicular light fixture according to claim 1, wherein said bent zones are of a thickness different from said other portions of said lamp body and said lens such that dew condensation occurs on said bent zones before forming on said other portions of said lamp body and said lens, thereby at least preventing or reducing an amount of dew condensation on said lens.

15. A vehicular light fixture comprising:

a lamp body opened to a front surface thereof;

a lens covering a front opening of said lamp body; and a light source disposed in a light chamber defined by said lamp body and said lens;

said lamp body being made of a synthetic resin, and formed at a part thereof with bent zones, other portions of said lamp body other than said bent zones having a substantially uniform wall thickness, and said bent zones having a smaller wall thickness than said other portions of said lamp body;

wherein said bent zones are formed with alternate convex and concave portions.

16. A vehicular light fixture comprising:

a lamp body opened to a front surface thereof;

a lens covering a front opening of said lamp body; and a light source disposed in a light chamber defined by said lamp body and said lens;

said lamp body being made of a synthetic resin, and formed at a part thereof with bent zones, other portions of said lamp body other than said bent zones having a substantially uniform wall thickness, and said bent zones having a smaller wall thickness than said other portions of said lamp body;

wherein said bent zones are formed with alternate convex and concave portions and wherein said bent zones of said lamp body have a wall thickness in the range of 1.0 mm to 1.5 mm and the other portions of said lamp body than said bent zones have a wall thickness of 2.0 mm or more.

17. A vehicular light fixture comprising:

a lamp body opened to a front surface thereof;

a lens covering a front opening of said lamp body; and a light source disposed in a light chamber defined by said lamp body and said lens;

said lamp body being made of a synthetic resin, and formed at a part thereof with bent zones, other portions of said lamp body other than said bent zones having a substantially uniform wall thickness, and said bent zones having a smaller wall thickness than said other portions of said lamp body;

wherein said bent zones are formed with alternate convex and concave portions, and are formed in positions lower than a position where said light source is arranged.

18. A vehicular light fixture comprising:

a lamp body opened to a front surface thereof;

a lens covering a front opening of said lamp body; and a light source disposed in a light chamber defined by said lamp body and said lens;

said lamp body being made of a synthetic resin, and formed at a part thereof with bent zones, other portions of said lamp body other than said bent zones having a substantially uniform wall thickness, and said bent zones having a smaller wall thickness than said other portions of said lamp body;

wherein said bent zones are formed with alternate convex and concave portions, and are formed in positions lower than a position where said light source is arranged, and wherein said bent zones of said lamp body have a wall thickness in the range of 1.0 mm to 1.5 mm and the other portions of said lamp body than said bent zones have a wall thickness of 2.0 mm or more.

* * * * *